United States Patent [19]
Ferrante

[11] Patent Number: 5,415,018
[45] Date of Patent: May 16, 1995

[54] STEERING WHEEL SECURITY DEVICE

[76] Inventor: Louis A. Ferrante, 149-17 Reeves Ave., Flushing, N.Y. 11367

[21] Appl. No.: 47,675

[22] Filed: Apr. 15, 1993

[51] Int. Cl.⁶ ............................................. B60R 25/02
[52] U.S. Cl. ........................................ 70/209; 70/168;
70/226; 74/551.8; 74/552
[58] Field of Search ................. 70/209, 211, 212, 225,
70/226, 237, 238, DIG. 58, 232, DIG. 63, 178,
180, 158, 163–173; 74/551.8, 552

[56] References Cited

U.S. PATENT DOCUMENTS

| | | | |
|---|---|---|---|
| 1,154,389 | 9/1915 | Fogalsang | 70/209 |
| 1,329,913 | 2/1920 | McGuire | 70/212 |
| 1,368,054 | 2/1921 | Recher | 70/212 |
| 1,395,532 | 11/1921 | Tilden | 70/212 |
| 2,458,002 | 1/1949 | Kaskouras | 70/211 |
| 4,577,478 | 3/1986 | Economopoulos et al. | 70/DIG. 63 X |
| 4,630,456 | 12/1986 | Nielsen, Jr. | 70/232 |
| 5,128,649 | 7/1992 | Elmer | 70/237 X |
| 5,199,284 | 4/1993 | Lin | 70/226 X |

FOREIGN PATENT DOCUMENTS

| | | | |
|---|---|---|---|
| 514024 | 6/1955 | Canada | 70/DIG. 63 |
| 919367 | 3/1947 | France | 70/212 |
| 2501134 | 9/1982 | France | 70/237 |
| 2520313 | 7/1983 | France | 70/237 |
| WO92/04211 | 3/1992 | WIPO | 70/209 |

Primary Examiner—Lloyd A. Gall
Attorney, Agent, or Firm—Kenneth P. Robinson

[57] ABSTRACT

A security device for an automobile type steering wheel includes a two-section rim protection arrangement having a circumferential skirt portion, which may be of concave cross-section, to shield the rim of the steering wheel. The rim protection sections are attached to two elongated beam members which are placed across the steering wheel rim, with an extension out from the rim which is long enough to limit rotation of the steering wheel. The two beam members are locked in position by locking fixtures which have an unlocked state permitting relative movement or rotation of the two rim protection sections for placement on the steering wheel rim and a locked state in which the security device is fixed in place on the steering wheel. Other embodiments include a unitary, central locking security device having locking fixtures which extend under a steering wheel rim and are locked in place.

21 Claims, 3 Drawing Sheets

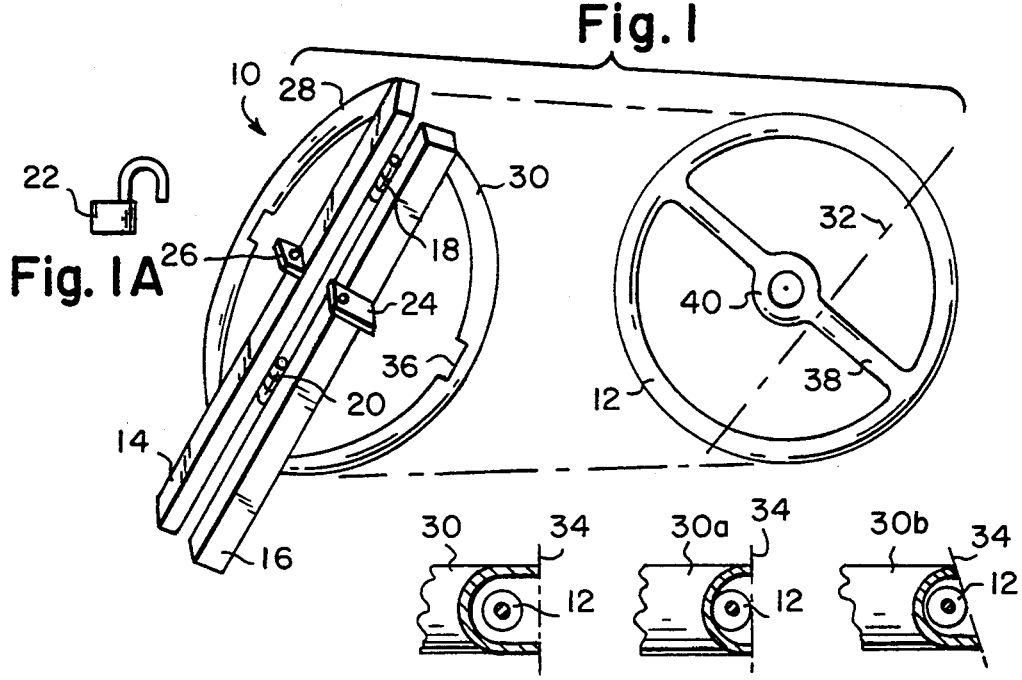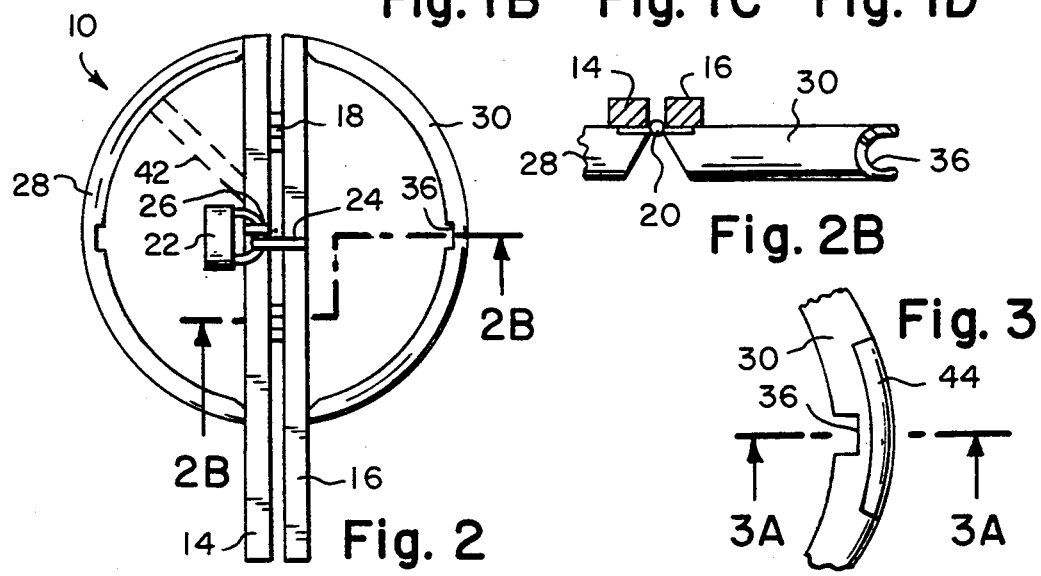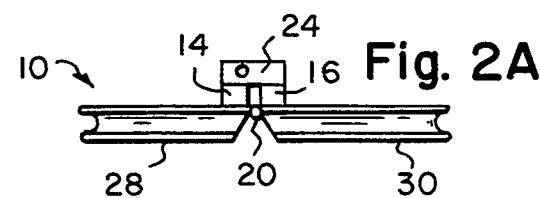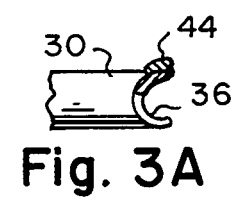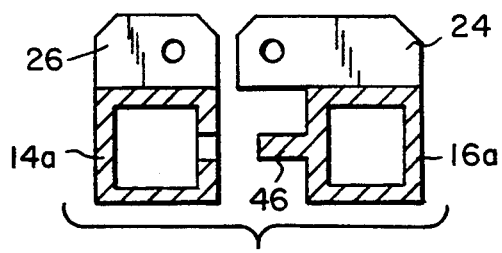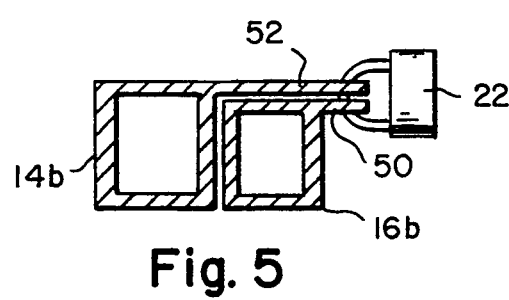

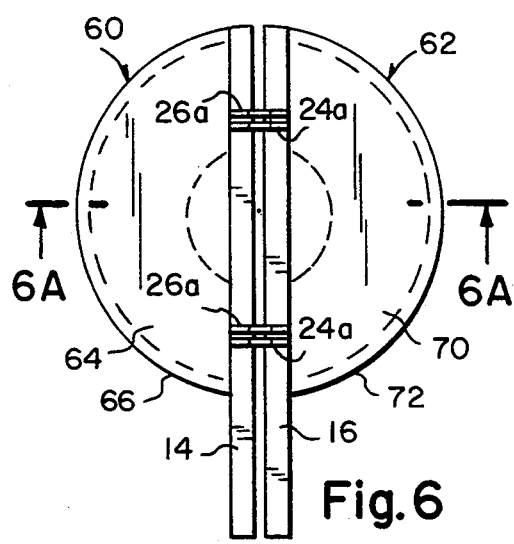
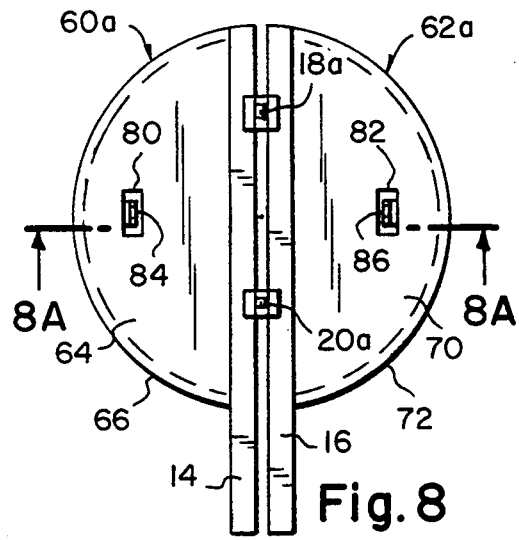
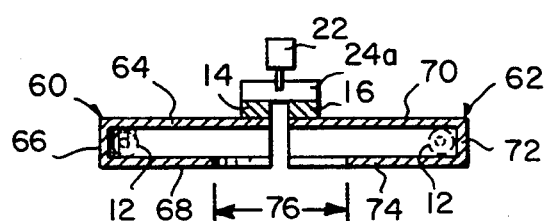
Fig. 6A
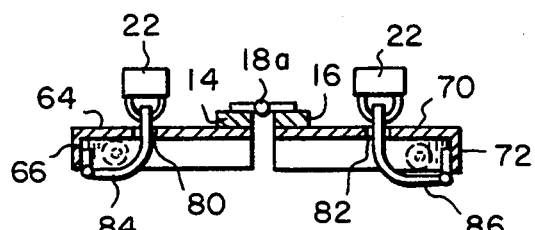
Fig. 8A
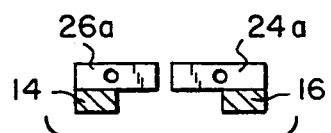
Fig. 7A
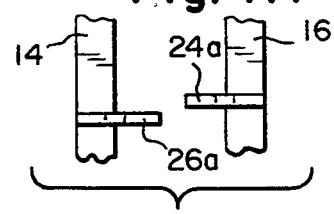
Fig. 7B
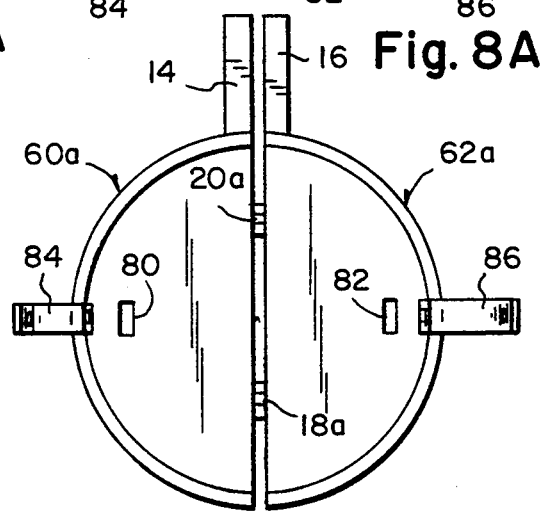

STEERING WHEEL SECURITY DEVICE

This invention relates to security devices and, more particularly, to such devices which may be attached to the steering wheel of an automobile so as to restrict movement of the steering wheel and thereby inhibit theft of the automobile.

BACKGROUND OF THE INVENTION

In recent years, increasing rates of theft of cars, vans and other motor vehicles have pointed up the inadequacy of door locks and ignition locks in preventing entry into and theft of such vehicles. In response, a variety of auxiliary devices have been proposed and marketed for use as additional deterrents to motor vehicle theft. Typically, such devices include a hardened steel bar arranged to be locked to the vehicle steering wheel and having a length which extends beyond the outer rim of the steering wheel to an extent that free movement of the bar, and thereby the steering wheel, are impeded. Thus, while the bar is in place the steering wheel cannot be freely rotated, because the extended end of the bar strikes other adjacent structures. As a result, the car or other vehicle cannot be driven with the bar locked in place.

Removal of such auxiliary devices, without the proper key to unlock the device, is impeded by provision of structural elements which are resistant to sawing or cutting and a variety of locking arrangements which may use hardened components or be enclosed to promote inaccessibility, or both. However, in practice it has been found that while it is difficult for a thief to cut, break or otherwise remove such auxiliary bars themselves, the steering wheel itself is a weak link in the protection chain. While many of these prior devices are relatively indestructible, the steering wheel is not. As a result, an automobile intended to be protected is actually subject to theft by the simple expedient of cutting through the plastic covered steering wheel rim and removing the protection bar via the cut. The automobile is then steerable and the steering wheel may actually have suffered only relatively minor damage and may be usable as is or with a piece of tape applied over the cut in order to hold the adjacent cut edges of the rim in circular alignment.

It is therefore an object of this invention to provide improved security devices and, particularly, security devices which, when locked in place on the steering wheel of a motor vehicle, are both difficult to remove and protective of the steering wheel itself, so as to provide additional security.

Additional objects are to provide new and improved steering wheel security devices which are effective to provide protection against motor vehicle theft, while at the same time avoiding one or more disadvantages of security devices as previously available.

SUMMARY OF THE INVENTION

In accordance with the invention, a security device, for use on a steering wheel having a rim supported from a central hub, includes a first elongated beam member suitable for placement across the steering wheel and having a length exceeding the diameter of the steering wheel, and a second elongated beam member arranged to be locked in contiguous parallel relationship to the first elongated beam member so as to permit separation or partial rotation of the second elongated beam member relative to the first elongated beam member. First rim protection means, of substantially semi-circular form, is attached to the first elongated beam member and has a circumferential skirt portion for shielding a first portion of the rim of the steering wheel to inhibit cutting of such first portion of the rim. Second rim protection means, similar to the first rim protection means, is attached to the second elongated beam member for shielding a second portion of the rim diametrically opposed to the first portion of the rim. The security device also includes locking means, having an unlocked state, for permitting relative movement of the first and second elongated beam members to enable the first and second rim protection means to be respectively placed in shielding position relative to the first and second portions of the rim and, having a locked state, for limiting relative movement of the first and second elongated beam members so as to inhibit removal of the security device from the steering wheel.

For a better understanding of the invention, together with other and further objects, reference is made to the following description taken in conjunction with the accompanying drawings and the scope will be pointed out in the appended claims.

BRIEF DESCRIPTION OF THE DRAWINGS

FIG. 1 shows a security device, in accordance with the invention, in rotated position in preparation for installation on a steering wheel and FIG. 1A shows a padlock suitable for locking the FIG. 1 security device in place. FIGS. 1B, 1C and 1D show different configurations of the rim protection portion of the FIG. 1 security device.

FIG. 2 is a plan view of the FIG. 1 security device in locked position, FIG. 2A is an end view of the FIG. 2 security device and FIG. 2B is a sectional view of the security device as shown in FIG. 2.

FIG. 3 is an enlarged view of a section of the FIG. 2 security device with a stiffening portion added and FIG. 3A is a sectional view of the security device as shown in FIG. 3.

FIGS. 4 and 5 are enlarged sectional views of different forms of the central portion of the FIG. 1 security device, which use interlocking arrangements different than the hinges shown in FIG. 1.

FIG. 6 shows a second embodiment of a security device in accordance with the invention. FIG. 6A is a cross-sectional view of the FIG. 6 device and FIGS. 7A and 7B are views of a portion of the security device of FIG. 6.

FIG. 8 shows a third embodiment. FIGS. 8A and 8B are cross-sectional and bottom views of the FIG. 8 security device.

DESCRIPTION OF THE INVENTION

Figure 9:
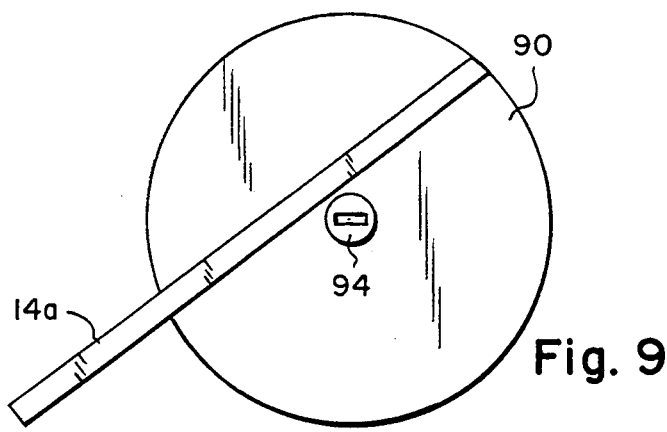
FIG. 9 shows a fourth embodiment of the invention.

Referring now to FIG. 1, there is shown a security device 10 constructed in accordance with the invention. As shown, device 10 includes two similar portions which have been rotated from an opposed 180° relationship to an obtuse angular relationship in preparation for installation on a typical form of automobile steering wheel having an outer rim 12, as shown at the right side of FIG. 1. As can be better seen by consideration of FIGS. 1, 2 and 2A, security device 10 includes a first elongated beam member 14, which is suitable for placement across a steering wheel (e.g., across rim 12) to be secured and has a length which exceeds the diameter of the steering wheel rim 12. The length of first elongated beam member 14 is selected to be long enough so that, when locked in place on the steering wheel, the freedom of rotation of the steering wheel is impeded by other elongated beam elements in the vicinity of the steering wheel in the interior of the automobile. Second elongated beam member 16, as shown, is attached to the first elongated beam member 14 by means of hinges 18 and 20. In this embodiment, the hinges 18 and 20 attach the second elongated beam member 16 to the first such member 14 so as to permit partial rotational movement of member 16 around the axis of the hinges 18 and 20 (such axis being parallel to the length of the first elongated beam member 14). Second elongated beam member 16 may have a length coextensive with member 14, as shown, or may have a length closer to the diameter of steering wheel 12. FIG. 1 shows the elongated beam members rotated from an opposed 180° relationship to a smaller obtuse angle relationship relative to each other, so as to permit installation on a steering wheel rim such as 12. FIGS. 2 and 2A show the elongated beam members 14 and 16 rotated to an opposed 180° or flat relationship. FIG. 1A shows a form of padlock 22, which has been applied in FIG. 2 in order to maintain the elongated beam members 14 and 16 in locked position. In FIG. 2A, which is an end view of FIG. 2, padlock 22 has been removed to show additional detail of the locking fixture 24. In FIG. 2A locking fixture 24 obscures visibility of the cooperating locking fixture 26, which is better seen in FIGS. 1 and 2.

The security device 10, as illustrated, further includes first and second rim protection means 28 and 30, each having a substantially semi-circular over-all form and a cross-section which has a concave or substantially semi-circular form (as will be discussed further with reference to FIGS. 1B, 1C and 1D). As shown, first rim protection means 28 is attached at its ends to the first elongated beam member 14 and second rim protection means 30 is similarly attached to the second elongated beam member 16. As illustrated in FIG. 1B, rim protection means 30 has a circumferential skirt portion extending downward from elongated beam member 16 and having a concave cross-section configured to shield a first portion of the steering wheel rim (e.g., the rim portion to the lower right of dotted line 32 in FIG. 1). By so shielding the steering wheel rim 12 as shown in FIG. 1B, any attempt to saw through the rim will be impeded, because a saw blade cannot readily approach rim 12 closer than the position represented by dotted line 34 in FIG. 1B. As shown, second rim protection means 30 includes a cut-out 36 which facilitates clearance of rim support spoke 38 (connecting steering wheel central hub 40 to the rim) when placing rim protection member 30 in position shielding the rim portion to the lower right of dotted line 32. As shown, rim protection member 28 has a similar cut-out suitable for the two-spoke steering wheel shown. Additional cut-outs similar to 36 can appropriately be provided or omitted to accommodate steering wheels having different numbers and locations of supporting spokes, or a universal type design can be provided to accommodate a variety of steering wheel designs.

As already referred to, the security device, as illustrated, also includes locking means to enable the security device to be fixed in position on a steering wheel.

As illustrated in FIGS. 1 and 2, the locking means include locking fixtures 24 and 26 respectively attached to elongated beam members 16 and 14. Locking fixtures 24 and 26 include circular openings which are aligned with each other when elongated beam members 16 and 14 are rotated to their opposed 180° relationship as shown in FIG. 2, permitting lock 22 to be inserted through both openings. When in place, lock 22 prevents elongated beam members 16 and 14 from being rotated to the position shown in FIG. 1, in which locking fixtures 24 and 26 are caused to swing away from each other. The various components of locking device 10 are constructed of steel, appropriately hardened, or other materials suitable for sturdy construction and resistant to breaking, bending or cutting so as to inhibit removal of the locking device while lock 22 is in place. Additional members or struts, such as indicated by dotted member 42 in FIG. 2, for example, may be added for increased structural stability, if desired.

Referring now to FIGS. 1B, 1C and 1D, each shows a cross-sectional portion of rim protection means 28 or 30 of FIG. 1 and illustrates the concave or substantially semi-circular shape suitable for placement over rim 12 so as to shield rim 12. As represented by dotted line 34, with rim 12 shielded by rim protector means 30, a saw blade would come in contact with the outer edges of means 30 before it could contact rim 12. Cutting of steering wheel rim 12 is thus inhibited while the security device is in place. FIG. 1C illustrates that the concave recess in rim protection means 30a may be less deep than in the FIG. 1B example, while still providing protection for rim 12, provided the security device diameter closely fits the steering wheel rim. FIG. 1D illustrates a modified embodiment wherein the lower edge of rim protection means 30b is extended, to make removal of the locked security device more difficult, and the upper edge may have a comparably reduced extension. A variety of curved, faceted or other cross-sectional shapes and sizes of the concave recess in rim protection means 30 can be provided in application of the invention by persons skilled in the art.

FIG. 2B shows a partial sectional view of the FIG. 2 security device. At the left side of FIG. 2B hinge 20 is shown in greater detail in its attachment to the lower surfaces of elongated beam members 14 and 16. Also, the attachment (behind the hinge 20) of rim protection means 28 and 30 is indicated along with angular cut-offs at the ends of means 28 and 30 to facilitate the partial relative rotation of members 14 and 16 downward to an angle less than the opposed 180° relationship of members 14 and 16 which is shown. As indicated in FIG. 2, the right side section for FIG. 2B is taken through the cut-out 36 referred to above. It will be appreciated that rim protection means 30 will have somewhat lower structural integrity in the area of cut-out 36. Additional rigidity may be provided in the vicinity of cut-out 36 by addition of a structural stiffening element 44 as shown in FIGS. 3 and 3A. Stiffening element 44, as well as other components of the security device can be assembled by welding or other appropriate attachment techniques for providing a finished assembly which is resistant to disassembly.

Referring now to FIGS. 4 and 5, there are illustrated alternative embodiments of the elongated beam members 14 and 16, which may avoid the need for inclusion of hinges 18 and 20. FIG. 4 is a sectional view of elongated beam members 14a and 16a in the form of hollow steel members (in substitution for the solid members 14 and 16 shown in FIG. 2). In the FIG. 4 embodiment, member 16a includes one or more longitudinal ribs 46 designed to be inserted into matched slots in member 14a, so as to form a secure structural unit when locked together by a lock such as 22 inserted through the holes in fixtures 24 and 26, when they are placed in alignment. In the FIG. 5 embodiment, elongated beam member 16b includes a side-extending portion 50 and member 14b has a longer side-extending portion 52, which extends over member 16b so as to be partially co-extensive with portion 50 to enable lock 22 to be inserted through aligned holes in portions 50 and 52. The side-extending portions 50 and 52 are thus brought into overlaying relationship and locked in that relationship. In this embodiment, portions 50 and 52 may extend lengthwise over a significant portion of the lengths of members 16b and 14b to provide structural integrity.

FIG. 6 Embodiment

Referring now to FIG. 6, there is illustrated an alternative embodiment of the invention. FIG. 6A shows a sectional end view in which a padlock 22 and dotted end views of steering wheel rim 12 have been added. As shown, elongated beam members 14 and 16 are generally as shown in, and described with reference to, FIG. 1, except that in FIG. 6 members 14 and 16 are not attached together by hinges, but are separable except when locked together via locking fixtures 24a and 26a, which will be described further with reference to FIGS. 7A and 7B.

In FIG. 6, the security device includes first rim protection means 60 and a similar, but mirror-opposite, second rim protection means 62. As illustrated in FIGS. 6 and 6A, rim protection means 60 includes a top portion 64 of substantially semi-circular form attached to the elongated beam member 14, a circumferential skirt portion 66 extending from top section 64 and a semi-circular annular bottom portion 68 attached to skirt portion 66. Second rim protection means 62 similarly includes top portion 70, circumferential skirt section 72 and annular bottom portion 74. With the security device in locked position, as shown in FIG. 6A, the annular nature of bottom portions 68 and 74 provide a circular opening of diameter 76 proportioned to fit around the steering column upon which a steering wheel 12 is mounted. In FIGS. 7A and 7B, there are shown sections of the elongated beam members 14 and 16 bearing similar locking fixtures 26a and 24a, which extend across the opposite respective beam members 16 and 14 when in contiguous locked position, so as to inhibit both separation and relative rotation of the beam members. FIG. 6 shows the presence of two sets of the locking fixtures 24a and 26a.

FIG. 8 Embodiment

With reference to FIG. 8, there is shown an additional embodiment of a security device in accordance with the invention. As illustrated, rim protection means 60a and 62a include top portions 64 and 70 and circumferential skirt portions 66 and 72 as described with reference to FIG. 6 (but lacking bottom portions 68 and 74 of FIG. 6). As shown in FIGS. 8 and 8A, elongated beam members 14 and 16 are attached by top-mounted hinges 18a and 20a, which permit the two rim protection means to rotate upward toward each other (rotate upward in the FIG. 8A view) when the security device is in an unlocked condition.

In FIGS. 8 and 8A there are also included hinged locking fixtures in the form of steel locking straps 84 and 86, which are attached in hinged relation to the circumferential skirt portions 66 and 72 and arranged to swing upward with the ends of fixtures 84 and 86 extending through slots 80 and 82 in the respective top portions 64 and 70. FIG. 8A shows the fixtures 84 and 86 extending through slots 80 and 82 and locked in place by locks 22. In FIG. 8 the fixtures 84 and 86 extend through the slots, but the locks are removed. FIG. 8B is a bottom view of the FIG. 8 security device showing the locking fixtures 84 and 86 swung free of slots 80 and 82 and extending outward from the rim protection means 60a and 62a.

It will be appreciated that in implementation of the invention specific shapes, dimensions and materials may be chosen as appropriate or desired. Thus, the circumferential skirt portion 66, instead of the flat vertical cross-section as shown, may have a curved or semi-circular cross-section configured to partially enclose the rim of a steering wheel (e.g., as shown in FIG. 1C, except that the center of curvature will be toward the wheel hub, rather than away from it as in FIG. 1C). With such a curved skirt, the hinged nature of the FIG. 8 device would enable the device to be placed over and partially around the steering wheel rim and then locked in place. Alternatively, with the provision of a flat vertical circumferential skirt portion 66, as shown in FIG. 8, it may be desirable to omit the hinges 18a and 20a and attach the elongated beam members together into a single beam member to form a unitary structure configured to be placed over a steering wheel and locked in place. In the drawings elements of the security devices are shown not to scale in order to better illustrate details of security devices using the invention.

FIG. 9 Embodiment

Referring now to FIG. 9, another embodiment of a security device in accordance with the invention is illustrated. As shown, elongated beam member 14a is attached to the top of a one-piece rim protection means 90 having a circumferential skirt portion 92 for shielding a steering wheel rim 12 represented in dotted form in FIG. 9D.

Figure 9A:
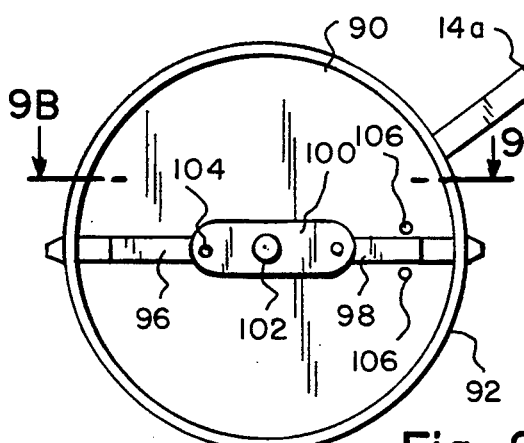
FIGS. 9A and 9C are bottom views of the FIG. 9 security device in locked and unlocked states and FIGS. 9B and 9D are respective cross-sectional views.
Figure 9C:
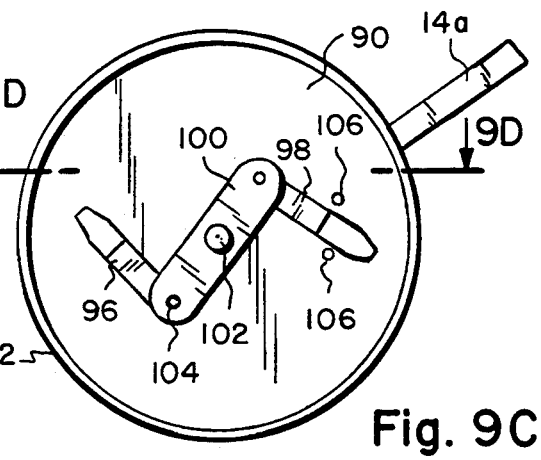
Figure 9B:
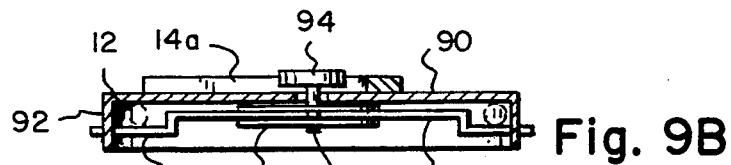
Figure 9D:
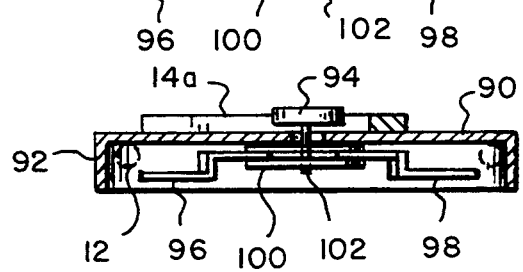

As shown in FIGS. 9, 9B and 9D, this embodiment includes locking means, including a centrally positioned key lock 94 and locking fixtures 96 and 98. Locking fixtures 96 and 98, as shown in FIGS. 9A and 9B, are connected to locking fixture control means 100, which is in turn fixed to the lock 94 by a central member 102. Member 102 is fixed to the lock 94 so that the turning of a key in lock 94 results in partial rotation of central member 102 and control means 100. As illustrated, control means 100 comprises two spaced steel sheet members to which locking fixtures 96 and 98 are rotatably connected by pins such as indicated at 104. As shown in FIGS. 9A and 9B, the locking fixtures 96 and 98 are in extended shielding position, relative to the dotted rim representation, and extend outward under the rim and protrude through openings in the skirt portion 92 of the rim protection means 90. With the ends of the locking fixtures 96 and 98 extending through the skirt portion 92 the positional stability of the locking fixtures constraining the steering wheel rim is increased, making any attempted removal of the security device more difficult.

Referring now to FIGS. 9C and 9D, the locking means is shown in its unlocked state. Thus, lock 94 has been activated to rotate locking fixture control means 100 away from the horizontal position shown in FIG. 9A to the inclined position shown in FIG. 9C. As a result of the off-center connection of locking fixtures 96 and 98 to control means 100, rotation of control means 100 causes locking fixtures 96 and 98 to be retracted from the openings in circumferential skirt portion 92. As illustrated in FIG. 9D, the arrangement is such that in this unlocked state of the structure of the locking means clearance is provided so that the security device can be removed from the steering wheel rim indicated at 12. In application of the invention by skilled persons, numerous details of structural design and dimensioning may be provided as appropriate. For example, guides extending from the inner surface of rim protection means 90, such as represented by pins 106, may be positioned to guide locking fixtures into the openings in skirt portion 92 when the security device is locked in place on a steering wheel rim. Also, depending upon the height of the steering wheel central hub 40 (see FIG. 1) relative to the height of the steering wheel rim, it may be desirable to provide a central raised portion of rim protection means 90, suitable for permitting locking fixture control means 100 to be recessed upward into means 90 to provide additional clearance room for hub 40 of the steering wheel. It will be appreciated that certain dimensions in the drawings are distorted for clarity of description and, for example, locking fixture control means 100 may actually extend downward into the space beneath the rim protection means 90 to a significantly lesser extent than appears from FIGS. 9B and 9D.

While there have been described the presently preferred embodiments of the invention, those skilled in the art will recognize that other and further modifications and variations may be made thereto without departing from the invention. For example, locking structures and technology are well developed and, once having the benefit of the invention, skilled persons will be enabled to utilize a variety of locking arrangements, as known from prior automobile security devices or other locking applications, to security devices utilizing the present invention. It is therefore intended to claim all such modifications and variations as fall within the scope of the invention.

What is claimed is:

1. A security device, for use on a vehicle steering wheel having a rim supported from a central hub, comprising:
    a first elongated beam member suitable for placement across said steering wheel and having a length exceeding the diameter of said steering wheel;
    a second elongated beam member suitable for placement across said steering wheel in contiguous parallel relationship to said first elongated beam member;
    first rim protection means, of substantially semi-circular form attached to said first elongated beam member and having a circumferential skirt portion, for shielding a first portion of said rim of said steering wheel to inhibit cutting of said first portion of said rim, said first elongated beam member extending beyond said first rim protection means by at least one-fourth of its total length;
    second rim protection means, similar to said first rim protection means and attached to said second elongated beam member, for shielding a second portion of said rim diametrically opposed to said first portion of said rim; and
    locking means, having an unlocked state, for permitting relative movement of said first and second elongated beam members to enable said first and second rim protection means to be respectively placed in shielding position relative to said first and second portions of said rim and, having a locked state, for limiting relative movement of said first and second elongated beam members so as to inhibit removal of said security device from said steering wheel.

2. A security device as in claim 1, wherein said second elongated beam member has a length equal to said length of said first elongated beam member and said equal lengths are sufficient to impede full rotation of said steering wheel when said security device is locked in place on said steering wheel.

3. A security device as in claim 1, wherein said first and second rim protection means each has a concave curved cross-section open around its outer circumference and having a depth not less than a cross-sectional dimension of said rim of said steering wheel.

4. A security device as in claim 1, wherein said locking means includes locking fixtures, attached to said first and second elongated beam members, configured to be brought into a position of alignment and locked in position.

5. A security device as in claim 4, wherein said locking fixtures include openings through which a padlock may be inserted to lock said locking fixtures in said position.

6. A security device, as in claim 1, wherein said locking means includes a rib, attached to said second elongated beam member, which is insertable into a matching slot in said first elongated beam member.

7. A security device, as in claim 1, wherein said locking means includes side-extending portions, attached to said first and second elongated beam members, which are configured to be brought into overlaying relationship and locked in said relationship.

8. A security device as in claim 1, wherein said first and second rim protection means each includes a top section of substantially semicircular form and said locking means includes first and second locking fixtures respectively attached to said circumferential skirt portions of said first and second rim protection means and hinged for insertion through respective openings in said top sections and locked in position.

9. A security device, for use on a steering wheel having a rim supported from a central hub, comprising:
    a first elongated beam member suitable for placement across said steering wheel and having a length exceeding the diameter of said steering wheel sufficiently to prevent full rotation of said security device by contact of said beam member with surrounding vehicle structure;
    a second elongated beam member attached to said first elongated beam member so as to permit partial rotation around an axis parallel to said length of said first elongated beam member;
    first rim protection means, of substantially semi-circular form attached to said first elongated beam member and having a circumferential skirt portion, for shielding a first portion of said rim of said steering wheel to inhibit cutting of said first portion of said rim and having at least one cut-out to accommodate a rib supporting said rim of said steering wheel from said central hub;
    second rim protection means, similar to said first rim protection means, having at least one said cut-out and attached to said second elongated beam member, for shielding a second portion of said rim diametrically opposed to said first portion of said rim; and locking means, having an unlocked state, for permitting partial relative rotation of said first and second elongated beam members to enable said first and second rim protection means to be respectively placed in shielding position relative to said first and second portions of said rim and, having a locked state, for preventing relative rotation of said first and second elongated beam members so as to inhibit removal of said security device from said steering wheel.

10. A security device as in claim 9, wherein said second elongated beam member has a length equal to said length of said first elongated beam member and said equal lengths are sufficient to impede full rotation of said steering wheel when said security device is locked in place on said steering wheel.

11. A security device as in claim 9, wherein said first and second rim protection means each has a concave curved cross-section open around its outer circumference and having a depth not less than a cross-sectional dimension of said rim of said steering wheel.

12. A security device as in claim 9, wherein said first and second rim protection means each include a stiffening element attached adjacent to each said cut-out.

13. A security device as in claim 9, wherein said locking means includes locking fixtures, attached to said first and second elongated beam members, configured to be brought into a position of alignment and locked in position.

14. A security device as in claim 13, wherein said locking fixtures include openings through which a padlock may be inserted to lock said locking fixtures in said position. removal of said security device from said steering wheel.

15. A security device, for use on a steering wheel having a rim supported from a central hub, comprising:
a first elongated beam member suitable for placement across said steering wheel and having a length exceeding the diameter of said steering wheel;
a second elongated beam member suitable for placement across said steering wheel in contiguous parallel relationship to said first elongated beam member;
first rim protection means, having a top portion of substantially semi-circular form attached to said first elongated beam member, a circumferential skirt portion extending from said top portion and a semi-circular annular bottom portion attached to said skirt portion, for shielding a first portion of said rim of said steering wheel to inhibit cutting of said first portion of said rim, said first elongated beam member extending beyond said first rim protection means by at least one-fourth of its total length;
second rim protection means, similar to said first rim protection means and attached to said second elongated beam member, for shielding a second portion of said rim diametrically opposed to said first portion of said rim; and
locking means, having an unlocked state, for permitting separation of said first and second elongated beam members to enable said first and second rim protection means to be respectively placed in shielding position relative to said first and second portions of said rim and, having a locked state, for preventing separation of said first and second elongated beam members so as to inhibit removal of said security device from said steering wheel.

16. A security device as in claim 15, wherein said second elongated beam member has a length equal to said length of said first elongated beam member and said equal lengths are sufficient to impede full rotation of said steering wheel when said security device is locked in place on said steering wheel.

17. A security device as in claim 15, wherein said locking means includes locking fixtures, attached to said first and second elongated beam members, configured to be brought into a position of alignment and locked in position.

18. A security device as in claim 17, wherein said locking fixtures include openings through which two padlocks may be inserted to lock said locking fixtures in said position.

19. A security device, as in claim 15, wherein said locking means includes a rib, attached to second elongated beam member, which is insertable into a matching slot in said first elongated beam member.

20. A security device, for use on a steering wheel having a rim supported from a central hub, comprising:
an elongated beam member suitable for placement across said steering wheel and having a length extending beyond the diameter of said steering wheel sufficiently to prevent full rotation of said security device by contact of said beam member with surrounding vehicle structure;
rim protection means, of substantially circular form attached to said elongated beam member and having a circumferential skirt portion, for shielding said rim of said steering wheel to inhibit cutting of said rim;
locking means, having an unlocked state, for permitting relative movement of first and second locking fixtures to enable said rim protection means to be placed in shielding position relative to said rim of said steering wheel and, having a locked state, for limiting movement of said first and second locking fixtures so as to inhibit removal of said security device from said steering wheel; and
a centrally positioned keylock rotatably controlling a locking fixture control means, connected in an off-center relationship to said first and second locking fixtures, for causing said locking fixtures to extend outward under said rim of said steering wheel when said locking means is in said locked state, and for causing said locking fixtures to be drawn inward from said rim when said locking means is in said unlocked state.

21. A security device as in claim 20, wherein said first and second locking fixtures extend outward under said rim in said locked state and protrude through openings in said rim protection means, so as to increase positional stability of said locking fixtures in said locked state.

* * * * *